US006275975B1

(12) United States Patent
Lambrecht et al.

(10) Patent No.: US 6,275,975 B1
(45) Date of Patent: *Aug. 14, 2001

(54) SCALABLE MESH ARCHITECTURE WITH RECONFIGURABLE PATHS FOR AN ON-CHIP DATA TRANSFER NETWORK INCORPORATING A NETWORK CONFIGURATION MANAGER

(75) Inventors: J. Andrew Lambrecht, Austin; Alfred C. Hartmann, Round Rock; Gary Michael Godfrey, Austin, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/189,762

(22) Filed: Nov. 10, 1998

Related U.S. Application Data

(63) Continuation-in-part of application No. 09/145,011, filed on Sep. 1, 1998, and a continuation-in-part of application No. 08/970,691, filed on Nov. 14, 1997, and a continuation-in-part of application No. 08/957,589, filed on Oct. 24, 1997, now Pat. No. 6,111,859, and a continuation-in-part of application No. 08/783,433, filed on Jan. 16, 1997, now abandoned, and a continuation-in-part of application No. 08/892,415, filed on Jul. 14, 1997, now Pat. No. 6,018,782.

(51) Int. Cl.[7] .................................................. G06F 17/50

(52) U.S. Cl. .................................... 716/14; 716/2; 716/4; 716/7

(58) Field of Search ................................. 716/2, 4, 7, 14

(56) References Cited

U.S. PATENT DOCUMENTS

| | | |
|---|---|---|
| 4,797,882 | 1/1989 | Maxemchuk . |
| 4,825,206 | 4/1989 | Brice, Jr. et al. . |
| 4,933,933 | 6/1990 | Dally et al. . |
| 5,041,963 * | 8/1991 | Ebersole et al. ..................... 370/407 |
| 5,138,615 | 8/1992 | Lamport et al. . |
| 5,153,876 * | 10/1992 | Sin ....................................... 370/392 |
| 5,577,213 * | 11/1996 | Avery et al. ......................... 710/100 |
| 5,621,726 * | 4/1997 | Murakimi ............................. 370/255 |
| 5,761,516 | 6/1998 | Rostoker et al. . |
| 5,908,468 * | 6/1999 | Hartmann ............................. 710/131 |
| 5,935,232 | 8/1999 | Lambrecht et al. . |

* cited by examiner

*Primary Examiner*—Matthew Smith
*Assistant Examiner*—Jibreel Speight
(74) *Attorney, Agent, or Firm*—Conley, Rose & Tayon PC; Jeffrey C. Hood

(57) ABSTRACT

A computer chip including a data transfer network which comprises a plurality of communications links for transmitting data, a plurality of communication nodes, and a plurality of modules. Each of the communication nodes is directly connected to two or more other communication nodes through respective ones of the communications links. Each communication node is operable to communicate data over the respective one of the communications links. Each module is coupled to at least one of the communication nodes, and the modules are operable to communicate with each other through the communication nodes. The communication nodes are operable to create dynamic routes for the data transferred between any two or more of the plurality of modules over the respective ones of the communications links. The communication nodes form the dynamic routes controlled by a network configuration manager.

18 Claims, 9 Drawing Sheets

SCALABLE MESH ARCHITECTURE WITH RECONFIGURABLE PATHS FOR AN ON-CHIP DATA TRANSFER NETWORK INCORPORATING A NETWORK CONFIGURATION MANAGER

CONTINUATION DATA

This is a continuation-in-part of co-pending application Ser. No. 09/145,011, filed Sep. 1, 1998, titled "Dynamically Configured On-Chip Communications Paths Based on Statistical Analysis", whose inventors are J. Andrew Lambrecht, Alfred C. Hartnann, and Gary Michael Godfrey.

This is also a continuation-in-part of co-pending application Ser. No. 08/970,691, filed Nov. 14, 1997 titled "Data Transfer Network on a Computer Chip Using a Re-Configurable Path Multiple Ring Topology", whose inventors are Gary Michael Godfrey and Alfred C. Hartmann.

This is also a continuation-in-part of application Ser. No. 08/957,589, filed Oct. 24, 1997 now U.S. Pat. No. 6,111,859, titled "Data Transfer Network on a Computer Chip Utilizing Combined Bus and Ring Topologies", whose inventors are Gary Michael Godfrey, J. Andrew Lambrecht and Alfred C. Hartmann.

This is also a continuation-in-part of application Ser. No. 08/783,433, filed Jan. 16, 1997 now abandoned, titled "Communication Traffic Circle System and Method for Performing Packet Conversion and Routing Between Different Packet Formats," whose inventor is Alfred C. Hartmann.

This is also a continuation-in-part of application Ser. No. 08/892,415, filed Jul. 14, 1997 now U.S. Pat. No. 6,018,782, titled "Flexible Buffering Scheme for Inter-Module On-Chip Communications", whose inventor is Alfred C. Hartmann.

BACKGROUND OF THE INVENTION

1. Field of the Invention

The present invention relates to computer chip architectures, and more particularly to an on-chip data transfer network that includes a scalable mesh architecture with re-configurable paths, which incorporates a configuration manager, for improved information routing between multiple on-chip modules.

2. Description of the Related Art

Computer systems have traditionally comprised a system unit or housing which comprises a plurality of electrical components comprising the computer system. A computer system typically includes a motherboard, which is configured to hold the microprocessor and memory, and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are involving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system and method is desired for including a plurality of different functions or modules on a single computer chip while providing efficient data transfers.

SUMMARY OF THE INVENTION

The present invention comprises a computer chip including a data transfer network. The data transfer network comprises a scalable mesh of a plurality of communications links for transmitting data, a plurality of communication nodes, a plurality of modules, and a network configuration manager. Each of the communication nodes are directly connected to two or more other communication nodes through respective ones of the plurality of communications links. Each of the communication nodes is operable to communicate data over the plurality of communications links in a multiplicity of routes. Each of the plurality of modules is coupled to at least one of the plurality of communication nodes, and the plurality of modules are operable to communicate with each other through the communication nodes. The plurality of communication nodes are operable to create dynamic routes for the data transferred between any two or more of the plurality of modules over the respective ones of the plurality of communications links.

In one embodiment, the network configuration manager receives at least one clock signal. The network configuration manager is operable to selectively reconfigure the multiplicity of routes among the plurality of communications links on a clocking basis based on the clock signal. In another embodiment, the network configuration manager is operable to selectively reconfigure the multiplicity of routes among the plurality of communications links on a messaging basis. One or more of the modules are operable to communicate a reconfiguration message to the network configuration manager. The reconfiguration message includes communications link configuration information. The network configuration manager receives the reconfiguration message and reconfigures one or more of the multiplicity of routes among the plurality of communications links based on the communications link configuration information comprised in the reconfiguration message.

In yet another embodiment, the network configuration manager is operable to selectively reconfigure the multiplicity of routes among the plurality of communications links on a process basis. A plurality of the modules are operable to execute a process which requires a first communications link configuration. One or more of the plurality of the modules communicates a reconfiguration message to the network configuration manager and requests the first transfer path configuration information. The network configuration manager receives the reconfiguration message and configures one or more of the plurality of communications links based on the first transfer path configuration information comprised in the reconfiguration message. Any number of pluralities of modules may request a different communications link configuration.

In still another embodiment, the network configuration manager is operable to selectively reconfigure the multiplicity of routes among the plurality of communications links on a process basis. One or more of the modules is operable to execute a process under control of an operating system. The operating system is operable to communicate a reconfiguration message to the network configuration manager, including communications link configuration information. The network configuration manager receives the reconfiguration message and reconfigures one or more of the plurality of communications links based on the communications link configuration information comprised in the reconfiguration message. In various embodiments, the network configuration manager selectively reconfigures one or more of the multiplicity of routes among the plurality of communications links only when commanded to reconfigure, such as by a module or an operating system.

BRIEF DESCRIPTION OF THE DRAWINGS

A better understanding of the present invention can be obtained when the following detailed description of the preferred embodiment is considered in conjunction with the following drawings, in which.

Figure 1:
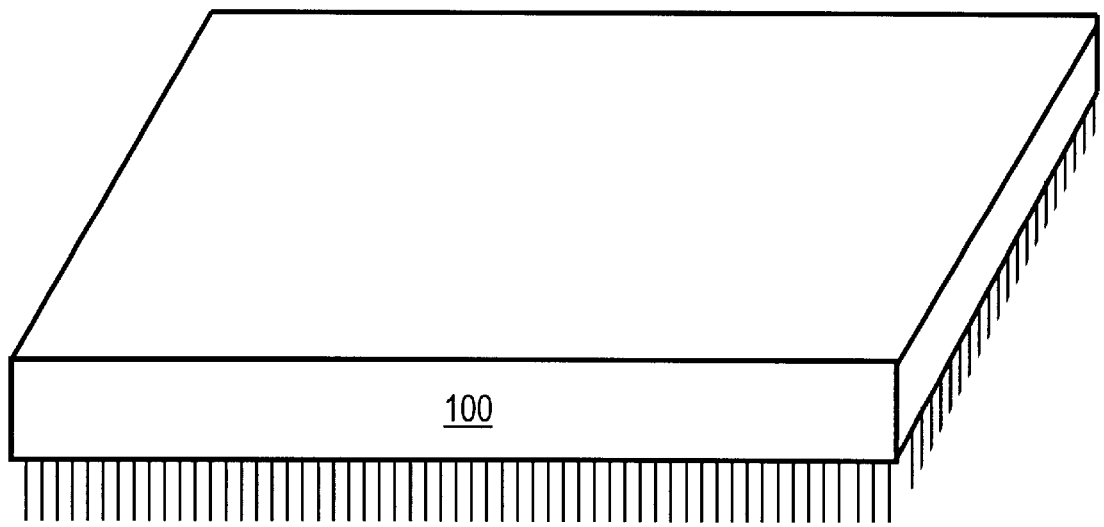
FIG. 1 illustrates a computer chip comprising an on-chip data transfer network according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

Incorporation by Reference

The following U.S. patent applications are hereby incorporated by reference in its entirety as though fully and completely set forth herein.

U.S. patent application Ser. No. 08/969,860, titled "Variable Latency and Bandwidth Communication Pathways" filed Nov. 14, 1997, whose inventors are J. Andrew Lambrecht and Alfred C. Hartmann; and U.S. patent application Ser. No. 09/145,011, titled "Dynamically Configured On-Chip Communications Paths Based on Statistical Analysis" filed Sep. 1, 1998, whose inventors are J. Andrew Lambrecht, Alfred C. Hartmann, and Gary Michael Godfrey.

The present invention comprises an on-chip data transfer network which includes a scalable mesh architecture incorporating a configuration manager for improved information routing between multiple on-chip modules. A uniform numbering system is adopted for this application. All components referred to with a common number are to be considered equivalent.

FIG. 1 —Computer Chip

Referring now to FIG. 1, a computer chip 100 is shown from an aspect view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 preferably utilizes a generic method for interconnecting multiple module types on a single computer chip 100 using intelligent buffering and a universal node design. Connecting each module to a communications pathway with a full duplex, general purpose communications node allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIG. 2–6 using the uniform numbering system.

FIG. 2 —Data Transfer Network Embodiment

Figure 2A:
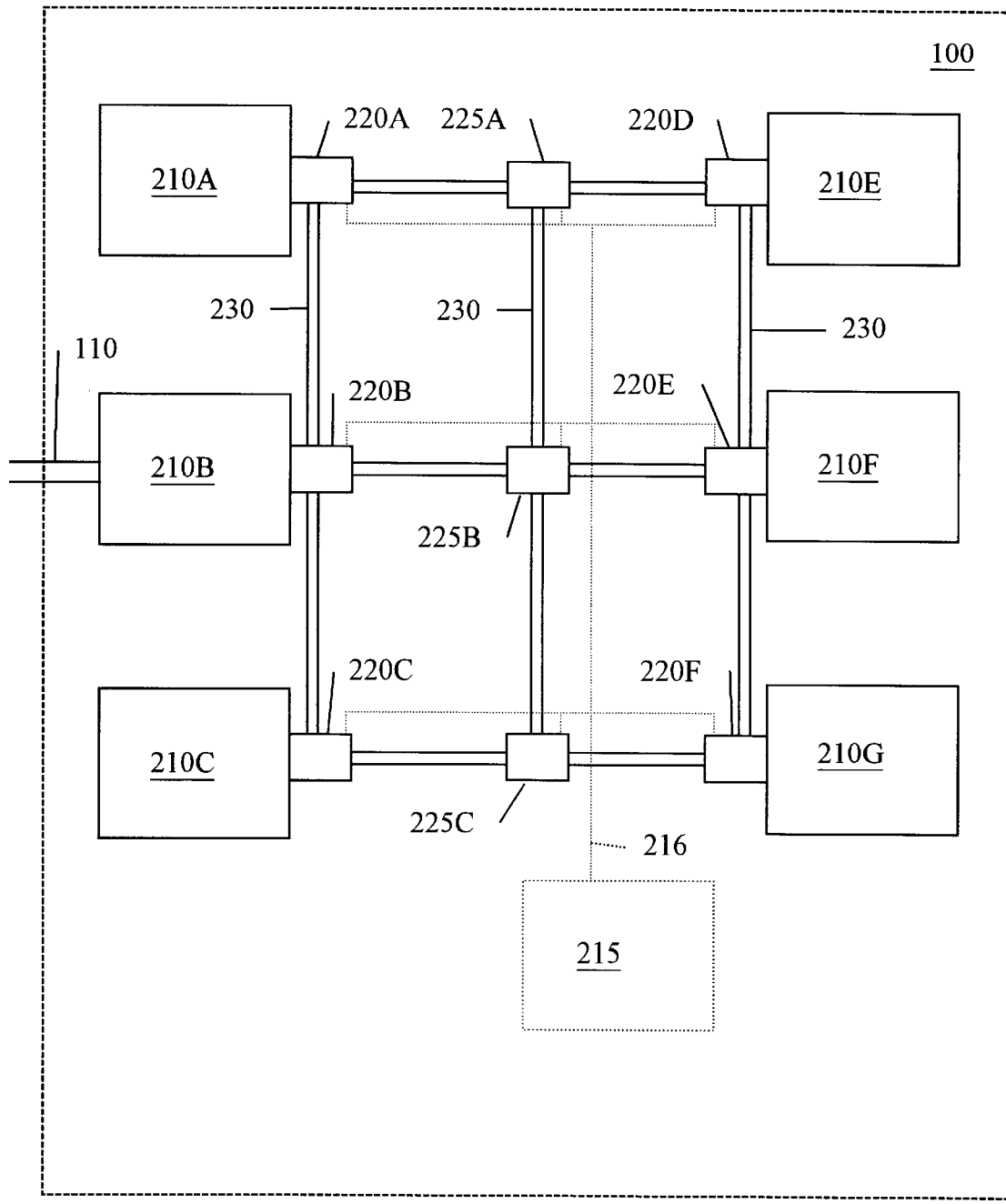
FIG. 2A; illustrates an embodiment of the on-chip data transfer network shown in FIG. 1 according to the present invention.

Referring now to FIG. 2A, an embodiment of computer chip 100 with an on-chip data transfer network is shown, for interconnecting a plurality of devices or modules 210A–210F linked by a plurality of communication nodes 220A–220F on single computer chip 100. The components of the network preferably include a bus 230 with the plurality communication nodes 220A–220F coupled to the bus 230 as well as a plurality of communication nodes 225A–225C coupled to segments of the bus 230. The bus 230 is comprised of the individual buses connecting between and among nodes 220A–220F and/or nodes 225A–225C. Communications nodes 225 are preferably a subset of the plurality of communication nodes 220 operable to transmit and receive data only on the bus 230. A reference to bus 230 may refer to the entire bus system or to a particular segment or component. The term bus as used in this disclosure is meant to extend to a bus which passes data along its entire physical length during a single transmission, as well as to a communications or transfer link which uses point-to-point data transmission.

Each of the plurality of modules 210 is coupled to at least one of the plurality of communication nodes 220. In various embodiments, communication nodes 220 and modules 210 are either directly connected or completely integrated as a single unit. The plurality of modules 210 are configurable to communicate with each other through the communication nodes 220. Modules 210 preferably perform operations, like a processor or an I/O controller, or storage like a memory, or a hybrid task, like a task specific hybrid (ASIC) or a task general hybrid. Processors, and hybrids including processing functionality, may run an operating system, either as an independent processor or as a group of distributed processors.

Starting on the left side of FIG. 2A, moving top to bottom, modules 210A–210C are respectively coupled to the bus 230 via communication nodes 220A–220C. Module 210B couples off-chip through off-chip bus 110. In the center, communication nodes 225A–225C are coupled to segments of the bus 230. On the right side of the figure modules 210D–210F are coupled to the bus 230 via communication nodes 220D–220F. Communication nodes 220A and 220D are electrically coupled to communication node 225A by bus 230. Likewise, communication node pairs 220B and 220E are electrically coupled to communication node 225B, and communication node pairs 220C and 220F are electrically coupled to communication node 225C. In another embodiment, all or part of the connections and communications are optical or chemical instead of electrical.

Although FIG. 2A shows six communication nodes 220 electrically coupled for information transmission on a bus 230 along with three communication nodes 225, one skilled in the art could add or subtract from these numbers as desired. Additionally, FIG. 2A shows each module 210 coupled to the bus 230 by only one communication node 220, one skilled in the art might also choose to connect a particular module 210 to more than one place on bus 230 through one or more additional communications nodes 220 or 225. For each coupling of objects or means, the coupling could be electrical, optical or mechanical as desired. Although not shown in FIG. 2A, routing between different computer chips 100 in similar fashions are also contemplated.

In one embodiment, the plurality of buses 230 coupled between the plurality of communications nodes 220 and/or 225 are operable to dynamically select different ones of the buses 230 to dynamically form one or more separate communication paths. These communication paths may cross each other, and some communications nodes 220 and/or 225 and/or bus segments may be included in more than one communication path concurrently. Transmissions on one path may be blocked and create a desire to rerouting over a new path for increased speed or efficiency. The grid-like shape shown in FIG. 2A, for example, may be expanded to form any geometry or hyper-geometric representation. As an example, more columns of communications nodes 225 coupled via buses 230 may be added to provide additional nexus points for the re-configurable communication paths. Each communications node 220 and/or 225 preferably includes configuration logic 360 which either controls the re-configurable communication paths or accepts configuration input from the modules 210 or other, possibly off chip, masters, such as via off-chip bus 110. Additional layers of communications nodes 225 coupled via bus 230 may also be added to increase the geometry to three or higher dimensions. For example, direct connections between computer chip 100 layers n, layers n±1, and n±2 represents a six dimensional embodiment.

In one embodiment, the dynamically formed data routes for the data are based on statistical data from previous transmissions between the plurality of modules 210, as described in the related application titled "Dynamically Configured On-Chip Communications Paths Based on Statistical Analysis". It is noted that communications nodes 220 are also referred to as inter-module nodes 220.

Figure 2B:
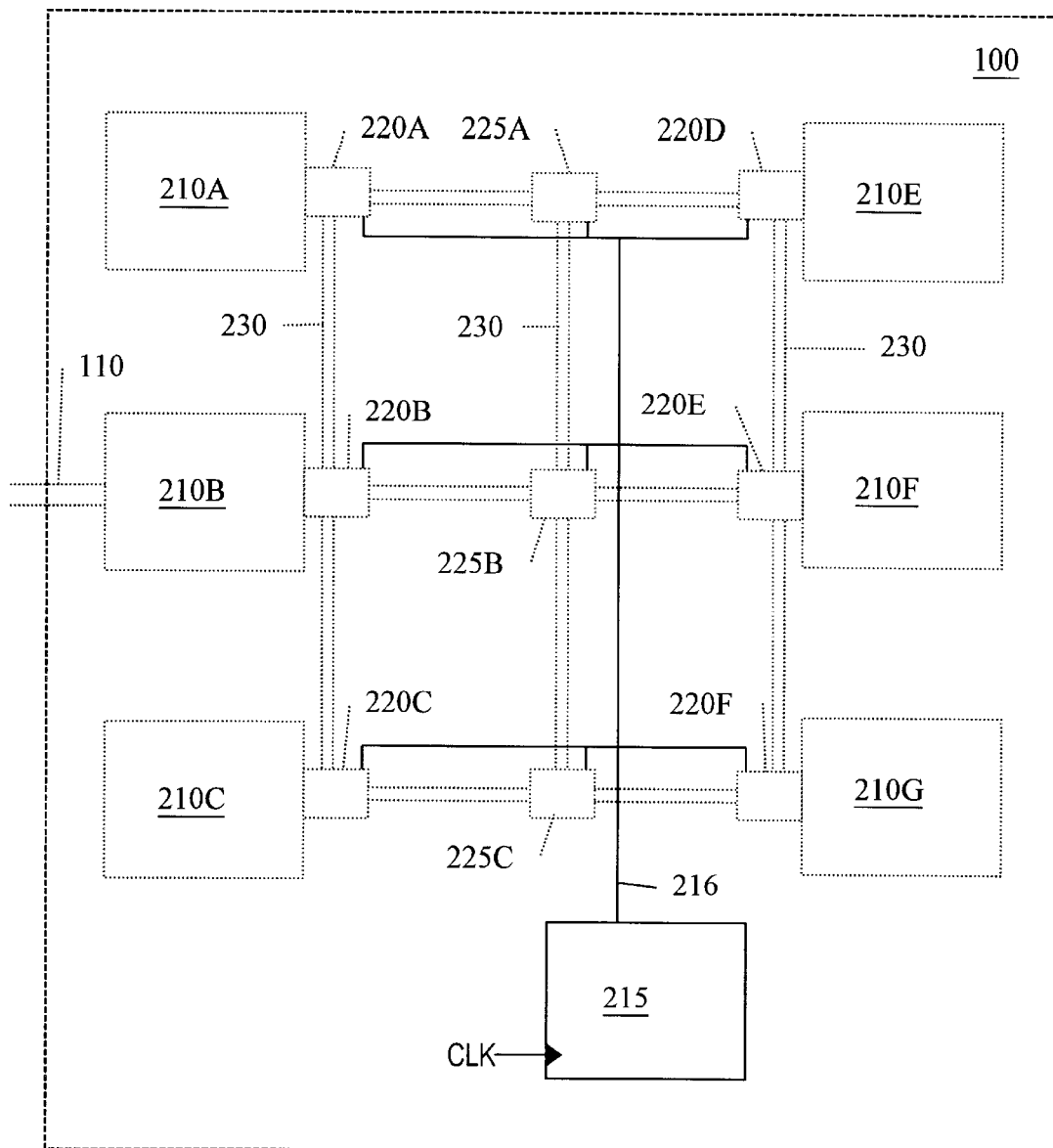
FIG. 2B illustrates an embodiment of a configuration manager control network in the embodiment of FIG. 2A, according to the present invention.

FIG. 2B - Configuration Manager Control Network

Referring now to FIG. 2B, an embodiment of the network configuration manager control network is shown along with the couplings between the network configuration manager 215, communication nodes 220 and 225. In this embodiment, the network configuration manager 215 is coupled via control bus 216 to communications nodes 220A–220F and communications nodes 225A–225C. It is noted that although control bus 216 is shown connected to nine communications nodes 220/225, the control bus 216 may be coupled to as many or few communications nodes 220/225 as desired.

In this embodiment, the network configuration manager receives a clock signal as an input. The network configuration manager is operable to selectively reconfigure the multiplicity of routes among the plurality of communications links on a clocking basis based on the clock signal. In another embodiment, the network configuration manager is operable to selectively reconfigure the multiplicity of routes among the plurality of communications links on a messaging basis. One or more of the modules are operable to communicate a reconfiguration message to the network configuration manager. The reconfiguration message includes communications link configuration information. The network configuration manager receives the reconfiguration message and reconfigures one or more of the multiplicity of routes among the plurality of communications links based on the communications link configuration information comprised in the reconfiguration message.

In yet another embodiment, the network configuration manager is operable to selectively reconfigure the multiplicity of routes among the plurality of communications links on a process basis. A plurality of the modules are operable to execute a process which requires a first communications link configuration. One or more of the plurality of the modules communicates a reconfiguration message to the network configuration manager and requests the first transfer path configuration information. The network configuration manager receives the reconfiguration message and configures one or more of the plurality of communications links based on the first transfer path configuration information comprised in the reconfiguration message. Any number of pluralities of modules may request a different communications link configuration.

In still another embodiment, the network configuration manager is operable to selectively reconfigure the multiplicity of routes among the plurality of communications links on a process basis. One or more of the modules is operable to execute a process under control of an operating system. The operating system is operable to communicate a reconfiguration message to the network configuration manager, including communications link configuration information. The network configuration manager receives the reconfiguration message and reconfigures one or more of the plurality of communications links based on the communications link configuration information comprised in the reconfiguration message. In various embodiments, the network a configuration manager selectively reconfigures one or more of the multiplicity of routes among the plurality of communications links only when commanded to reconfigure, such as by a module or an operating system. Additional details concerning FIG. 2 are disclosed elsewhere.

FIG. 3 —Another Data Transfer Network Embodiment

Figure 3A:
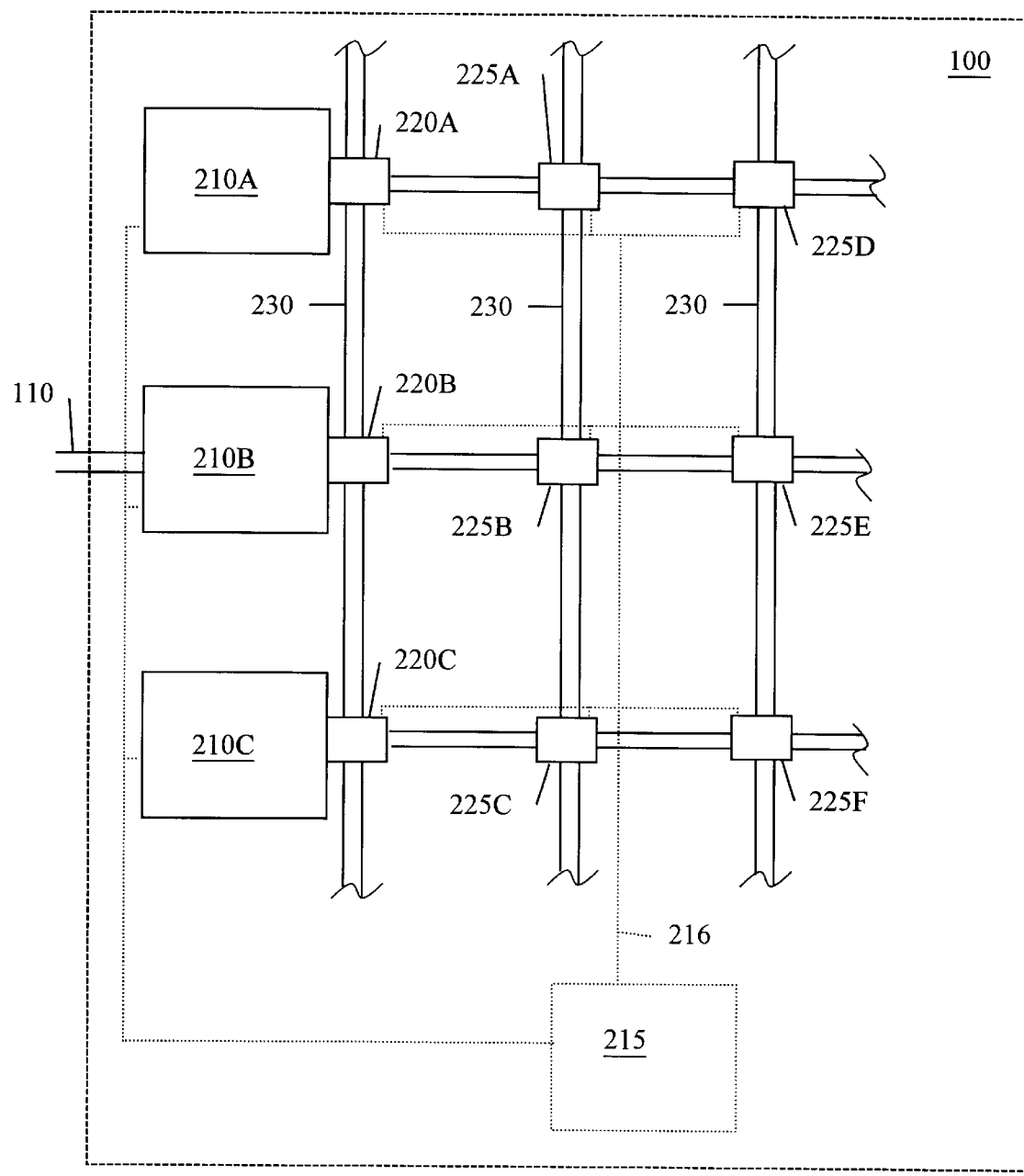
FIG. 3A; illustrates another embodiment of the on-chip data transfer network shown in FIG. 1 according to the present invention.

Referring now to FIG. 3A, an embodiment of computer chip 100 with an on-chip scalable mesh data transfer network is shown, for interconnecting a plurality of devices or modules 210A–210C linked by a plurality of communication nodes 220A–220C on single computer chip 100. The components of the network preferably include a bus 230 with the plurality communication nodes 220A–220C coupled to the bus 230 as well as a plurality of communication nodes 225A–225F coupled to segments of the bus 230. The bus 230 is comprised of the individual buses connecting between and among nodes 220A–220C and/or nodes 225A–225F.

Each of the plurality of modules 210 is coupled to at least one of the plurality of communication nodes 220. The plurality of modules 210 are configurable to communicate with each other through the communication nodes 220/225. Modules 210 preferably perform operations, like a processor or an I/O controller, or storage like a memory, or a hybrid task, like a task specific hybrid (ASIC) or a task general hybrid.

Starting on the left side of FIG. 3A, moving top to bottom, modules 210A–210C are respectively coupled to the bus 230 via communication nodes 220A–220C. Module 210B couples off-chip through off-chip bus 110. In the center, communication nodes 225A–225C are coupled to segments of the bus 230. On the right side of the figure communications nodes 225D–225F are coupled to the bus 230 via communication nodes 225A–220C. Bus 230 extends in any direction as desired. In another embodiment, all or part of the connections and communications are optical or chemical instead of electrical.

Although FIG. 3A shows three communication nodes 220 electrically coupled for information transmission on a bus 230 along with six communication nodes 225, one skilled in the art could add or subtract from these numbers as desired. Additionally, FIG. 2A shows each module 210 coupled to the bus 230 by only one communication node 220, one skilled in the art might also choose to connect a particular module 210 to more than one place on bus 230 through one or more additional communications nodes 220 or 225. For each coupling of objects or means, the coupling could be electrical, optical or mechanical as desired. Although not shown in FIG. 3A, routing between different computer chips 100 in similar fashions are also contemplated.

In one embodiment, the plurality of buses 230 coupled between the plurality of communications nodes 220 and/or 225 are operable to dynamically select different ones of the buses 230 to dynamically form one or more separate communication paths. These communication paths may cross each other, and some communications nodes 220 and/or 225 and/or bus segments may be included in more than one communication path concurrently. Transmissions on one path may be blocked and create a desire to rerouting over a new path for increased speed or efficiency. The mesh shape shown in FIG. 2A, for example, may be expanded to form any geometry or hyper-geometric representation. As an example, more columns of communications nodes 225 coupled via buses 230 may be added to provide additional nexus points for the re-configurable communication paths. Each communications node 220 and/or 225 preferably includes configuration logic 360 which either controls the re-configurable communication paths or accepts configuration input from the modules 210 or other, possibly off chip, masters, such as via off-chip bus 110. Additional layers of communications nodes 225 coupled via bus 230 may also be added to increase the geometry to three or higher dimensions.

Figure 3B:
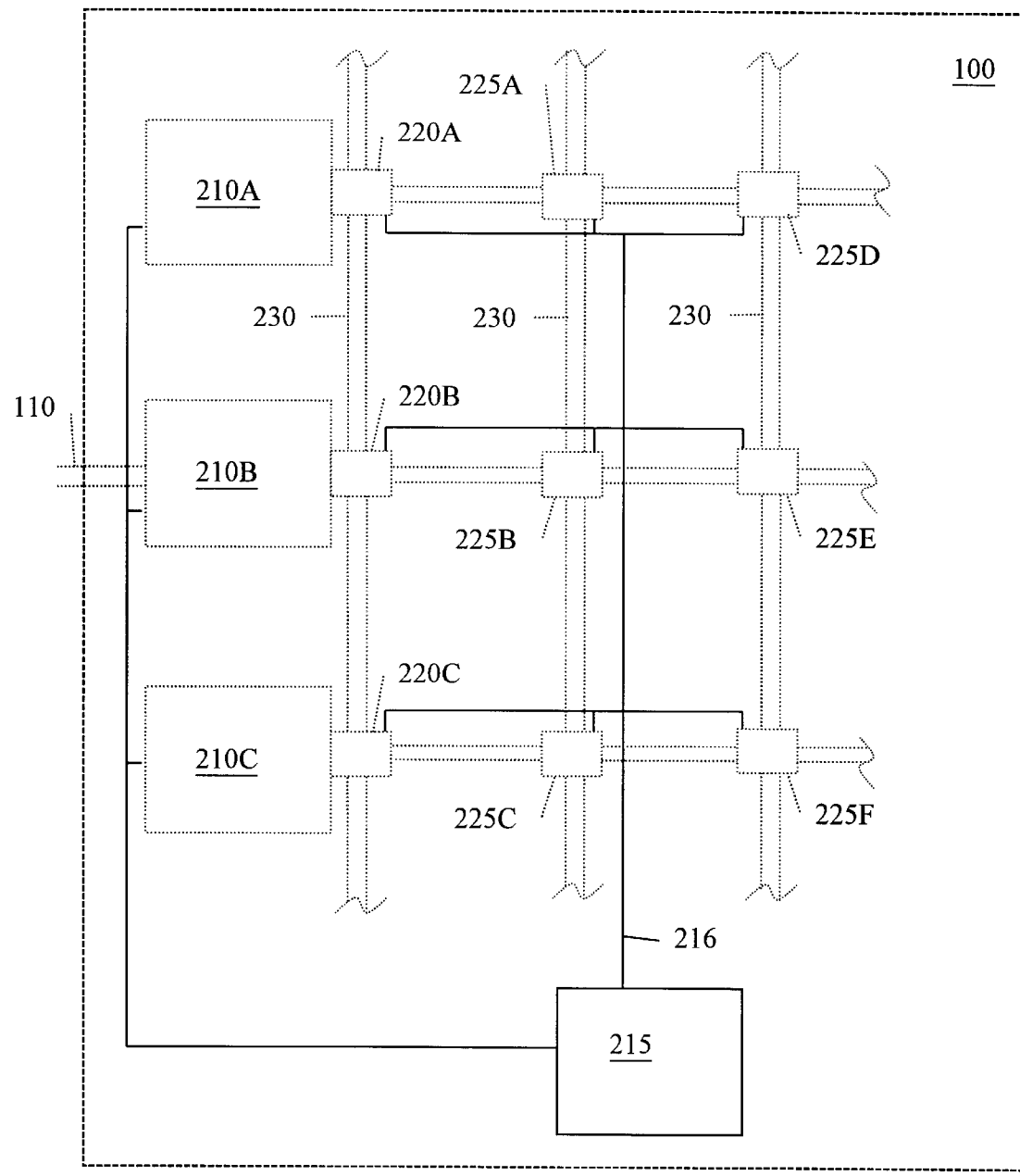
FIG. 3B illustrates another embodiment of a configuration manager control network in the embodiment of FIG. 3A, according to the present invention.

FIG. 3B - Configuration Manager Control Network

Referring now to FIG. 3B, an embodiment of the network configuration manager control network is shown along with the couplings between the network configuration manager 215, communication nodes 220 and 225 and modules 210. Similar to the embodiment shown in FIG. 2B, the network configuration manager 215 is coupled to the modules 220 and the communications nodes 220/225 through control bus 216.

In one embodiment, all, or at least 75%, of the communications nodes 225 are directly connected to each other to provide a completely scalable mesh communications architecture. This embodiment may allow for complete freedom in routing data between modules 210. Such embodiments are difficult to illustrate in two dimensions, so the figures disclosed herein lack the third or higher dimensions. Additional details concerning FIG. 3 are disclosed elsewhere.

Figure 4A:
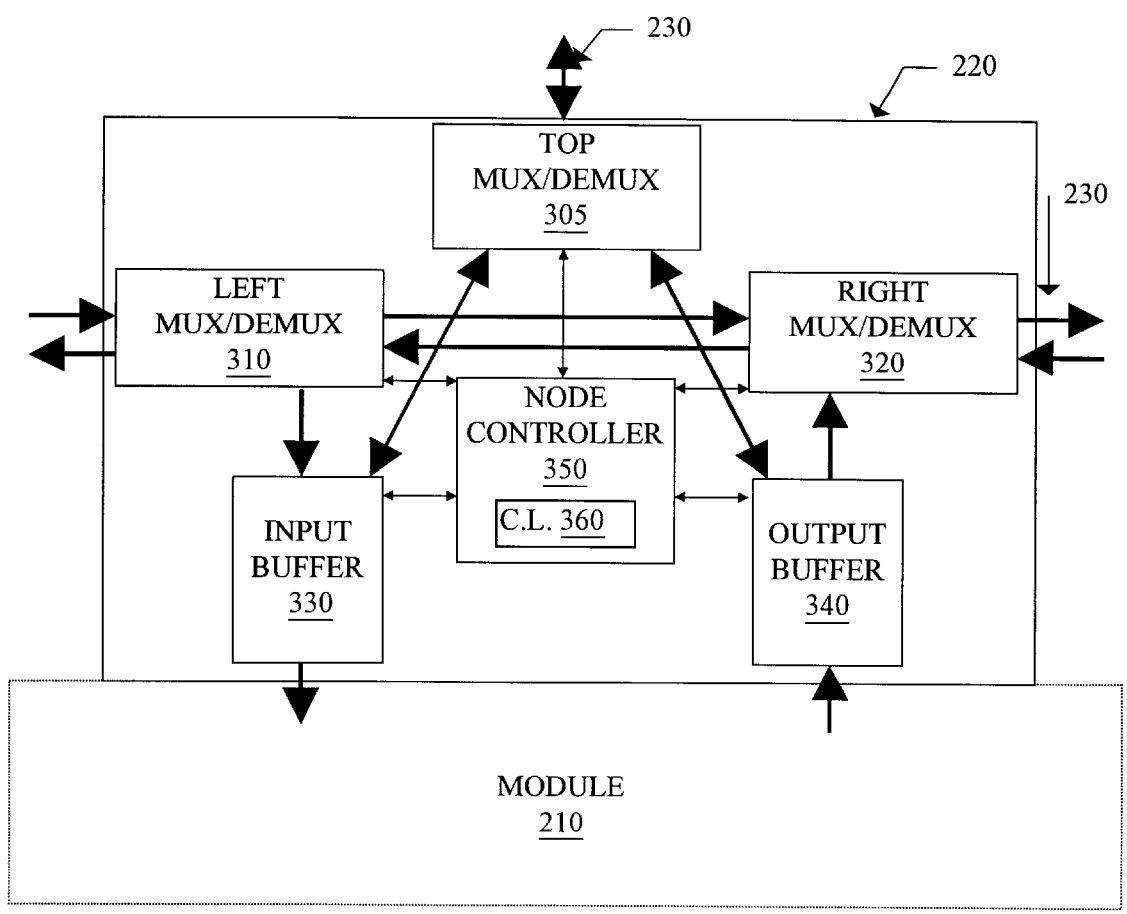
FIG. 4A illustrates an embodiment of a communication node shown in FIG. 1 according to the present invention.

FIG. 4A —Communication Node

Referring now to FIG. 4A, an embodiment of communication node 220 is shown along with the couplings between communication node 220 and bus 230. Although communication node 220 is shown as a separate item from module 210, in another embodiment communication node 220 may be incorporated into module 210. Preferably included as components of communication node 220 are top multiplexer (MUM)/demultiplexer(DEMUX) 305 coupled to one segment of the bus 230, a pair of MUX/DEMUXs, left MUX/DEMUX 310 and right MUX/DEMUX 320, each coupled to other segments of bus 230, input buffer 330, output buffer 340 and node controller 350. Left MUX/DEMUX 310 and right MUX/DEMUX 320 are coupled together. Left MUX/DEMUX 310 is further coupled to input buffer 330, which is further coupled to module 210. Right MUX/DEMUX 320 is further coupled to output buffer 340 which is also coupled to module 210.

Figure 5:
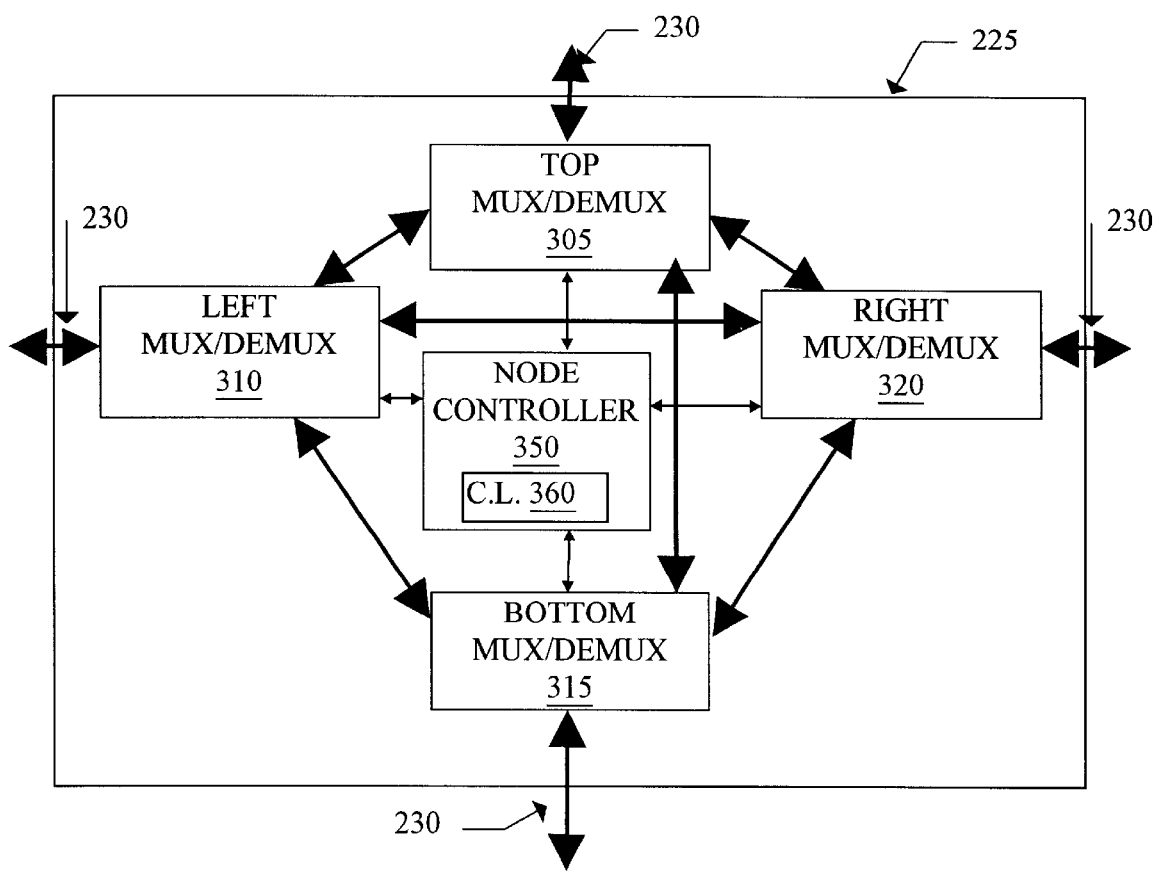
FIG. 5 illustrates a different embodiment of a communication node according to the present invention.

Operations of communication node 220 are preferably controlled by the node controller 350 which preferably includes bus interface logic (not shown) and configuration logic 360 for selectively routing data between and/or among the various buses 230. All included components of node controller 350 may also be comprised in module 210 or a separate part of computer chip 100. In a preferred embodiment, node controller 350, including bus interface logic and configuration logic 360, is coupled to various segments of the bus 230. As shown in FIG. 5 the node controller 350 issues communications and/or commands to top MUX/DEMUX 305, left MUX/DEMUX 310, right MUX/DEMUX 320, input buffer 330 and output buffer 340. In addition top MUX/DEMUX 305 is coupled to input buffer 330 and output buffer 340.

Node controller 350 is preferably operable to control transfer of data to and from one segment of bus 230 and module 210 by way of top MUX/DEMUX 305 via input buffer 330 and output buffer 340. Node control 350 is also preferably operable to control information transfer between other segments of bus 230 and module 210 by regulating transfer of data from module 210 to output buffer 340 through the right MUX/DEMUX 320 and onto bus 230. In this embodiment node controller 350 controls transfer of data from the various segments of the bus 230 to other various segments of the bus 230 through transfer of data from top MUX/DEMUX 305 to output buffer 340 through right MUX/DEMUX 320 and then onto bus 230. Optionally, right MUX/DEMUX 320 can routed data through left MUX/

DEMUX 310 before it is transferred to bus 230. The reverse data transfers are also contemplated.

Input buffer 330 and output buffer 340 may also be comprised as part of module 210. Top MUX/DEMUX 305, left MUX/DEMUX 310, and right MUX/DEMUX 320, input buffer 330 and output buffer 340 may interchangeably be data transfer buffers and/or multiplexers and/or demultiplexers. Each communication node 220 preferably includes one or more data transfer buffers. At least a first portion of the one or more data transfer buffers is coupled to the bus interface logic that is preferably part of node controller 350. The first portion of the one or more data transfer buffers is configurable to communicate information between the module 210 and the various segments of the bus 230. A second portion of the one or more data transfer buffers is coupled to the bus interface logic preferably included in node controller 350. The second portion of the one or more data transfer buffers is configurable to communicate information among the various segments of the bus 230.

In another embodiment, computer chip 100 includes an additional plurality of buffers with each of the buffers coupled between their respective communication node 220 and the bus 205. This plurality of buffers is operable for buffering data between a respective communication node 220 and the bus 230.

Figure 4B:
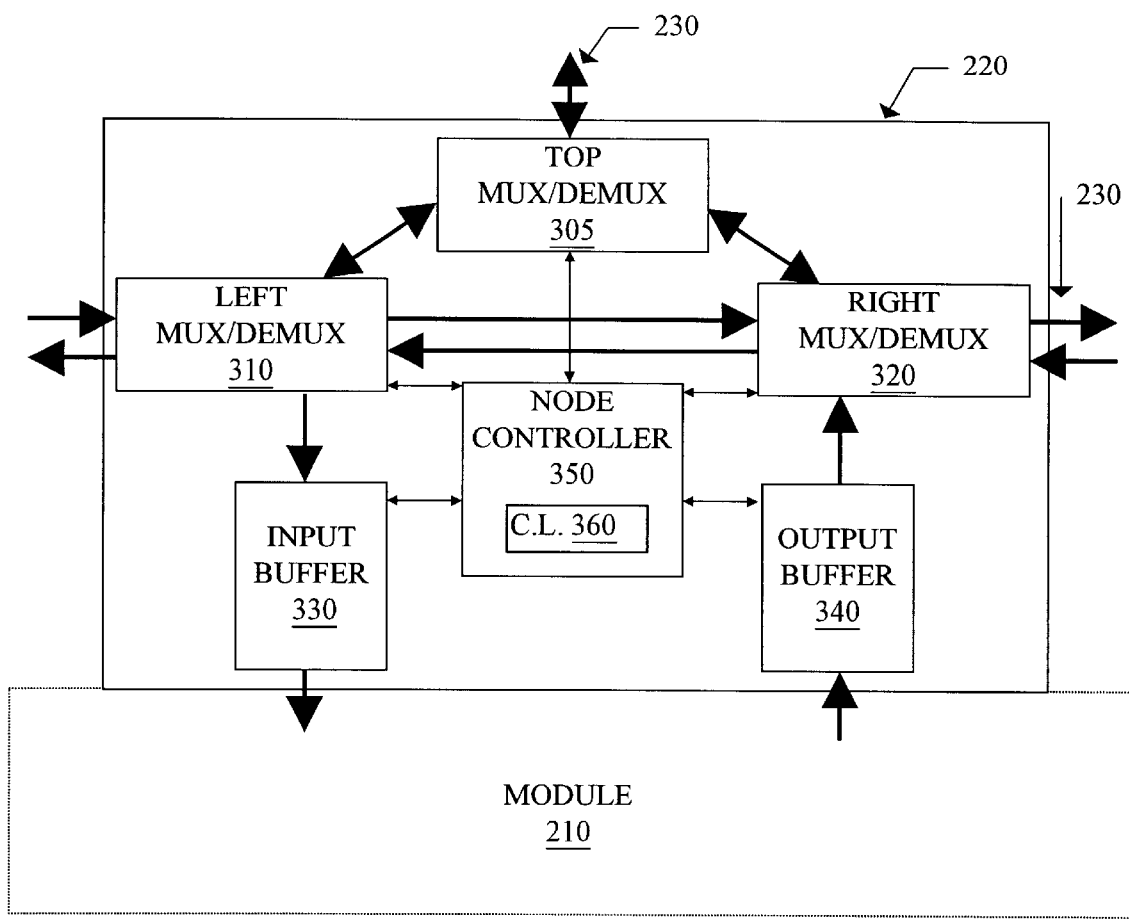
FIG. 4B illustrates another embodiment of a communication node shown in FIG. 1, according to the present invention.

FIG. 4B —Another Communications Node

Referring now to FIG. 4B, an embodiment is shown of communications node 220 wherein data transfers among the bus 230 and the module 210 are made from top MUX/DEMUX 305 directly to and from left MUX/DEMUX 310 and/or right MUX/DEMUX 320. In this embodiment top MUX/DEMUX 305 is not connecting to input buffer 330 or output buffer 340. Otherwise the components, operations and designations in FIG. 4B are the same as FIG. 4A. Other connections between MUX/DEMUXes and buffers are also contemplated. Additional details concerning FIG. 4 are disclosed elsewhere.

FIG. 5 —Four Way Communications Node Embodiment

Referring now to FIG. 5, an embodiment is shown of communications node 225 for data transfers among the various segments of the bus 230. The illustrated embodiment is similar in design to the embodiment of communications node 220 shown in FIG. 4B with the input buffer 330 and the output buffer 340 replaced by a bottom MUX/DEMUX 315 coupled to the top MUX/DEMUX 305, left MUX/DEMUX 310 and right MUX/DEMUX 320. Control of the bottom MUX/DEMUX 315 is preferably by the node controller 350 as shown.

Communications node 225 is shown with all four units 305, 310, 315, and 320 coupled to four segments of the bus 230. Alternatively, top MUX/DEMUX 305 and/or bottom MUX/DEMUX 315 is coupled to the backbone bus 205 or a module 210. When configured as coupled to one or more of the modules 210, communications node 225 becomes an embodiment of communications node 220. Otherwise the components, operations and designations in FIG. 5 are similar to those in FIGS. 4A and 4B. Additional details concerning FIG. 5 are disclosed elsewhere. It is noted that although the communications nodes 220/225 are shown in two dimensions, the connections in three or more dimensions are contemplated as being made in a similar fashion. The two dimensional embodiments are to be considered exemplary only.

Figure 6:
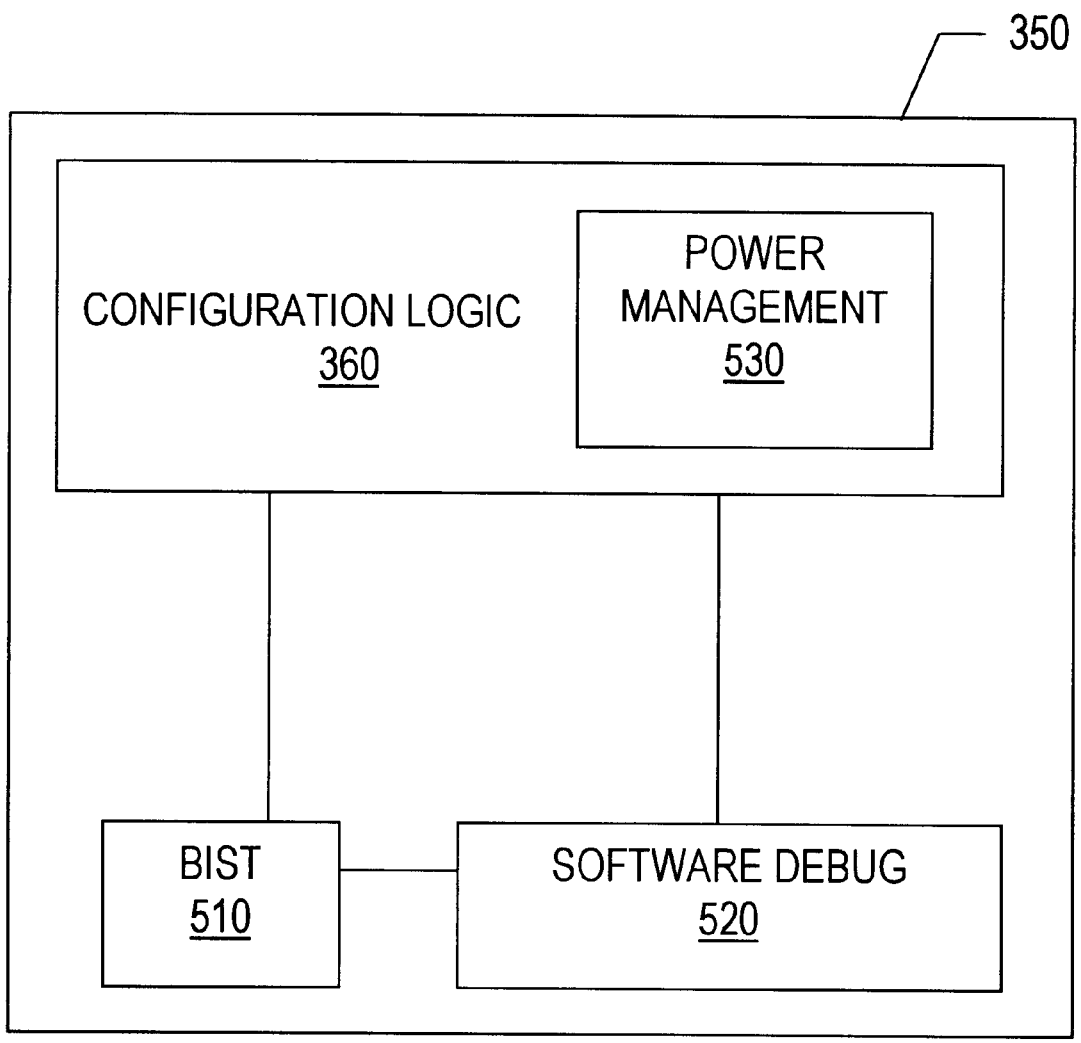
FIG. 6. Illustrates an embodiment of a port controller for a communication node of FIG. 5.

FIG. 6 —Node Controller Embodiment

Referring now to FIG. 6, an embodiment is shown of node controller 350. Configuration logic 360 is shown with optional power management unit 530. It is contemplated that the power management unit 530 operates to slow or suspend operations of its respective communications node 220/225 when power conservation is needed. Configuration logic 360 is also shown with an optional built-in self-test (BIST) 510 and an optional software debug unit 520. The BIST 510 is operable to provide power-on and possibly on-going checking of the integrity of the operations of the respective communications node 220/225. Software debug unit 520 may include registers and/or break-point monitoring logic for aiding in debugging programming running on the computer chip 100.

Conclusion

Although the system of the present invention has been described in connection with the preferred and various embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A dynamically reconfigurable communications network on a computer chip, comprising:

a plurality of communications links for transmitting data;

a plurality of communication nodes, wherein each of said communication nodes are directly connected to one or more other communication nodes through respective ones of said plurality of communications links, wherein each of said communication nodes are operable to communicate data over the plurality of communications links; and a plurality of modules, wherein each of said plurality of modules is coupled to at least one of said plurality of communication nodes, wherein said plurality of modules are operable to communicate with each other through data transmissions via said communication nodes over a multiplicity of routes;

a network configuration manager comprised on said computer chip, wherein said network configuration manager is coupled to said plurality of communications nodes for dynamically re-configuring said multiplicity of routes formed by said plurality of communications links and said plurality of communication nodes, wherein said network configuration manager is operable to control said plurality of communications nodes to selectively enable and disable one or more of said communications links to selectively provide communication between selected ones of said plurality of modules along one or more of said multiplicity of routes.

2. The dynamically reconfigurable communications network of claim 1, wherein said network configuration manager receives at least one clock signal, wherein said network configuration manager is operable to selectively reconfigure said multiplicity of routes among said plurality of communications links on a clocking basis based on said clock signal.

3. The dynamically reconfigurable communications network of claim 1, wherein said network configuration manager is operable to selectively reconfigure said multiplicity of routes among said plurality of communications links on a messaging basis;

wherein one or more of said modules are operable to communicate a reconfiguration message to said network configuration manager, wherein said reconfiguration message includes communications link configuration information; and wherein said network configuration manager receives said reconfiguration message and reconfigures one or more of said multiplicity of routes among said plurality of communications links based on said transfer path configuration information comprised in said reconfiguration message.

4. The dynamically reconfigurable communications network of claim 1, wherein said network configuration manager is operable to selectively reconfigure said multiplicity of routes among said plurality of communications links on a process basis;
wherein a plurality of said modules are operable to execute a process which requires a first transfer path configuration, wherein one or more of said plurality of said modules communicates a reconfiguration message to said network configuration manager, wherein said reconfiguration message requests said first transfer path configuration information;
wherein said network configuration manager receives said reconfiguration message and configures one or more of said plurality of communications links based on said first transfer path configuration information comprised in said reconfiguration message.

5. The dynamically reconfigurable communications network of claim 1, wherein said network configuration manager is operable to selectively reconfigure said multiplicity of routes among said plurality of communications links on a process basis;
wherein one or more of said modules are operable to execute a process under control of an operating system, wherein said operating system is operable to communicate a reconfiguration message to said network configuration manager, wherein said reconfiguration message includes transfer path configuration information;
wherein said network configuration manager receives said reconfiguration message and reconfigures one or more of said plurality of communications links based on said includes transfer path configuration information comprised in said reconfiguration message.

6. The dynamically reconfigurable communications network of claim 1, wherein said network configuration manager selectively reconfigures one or more of said multiplicity of routes among said plurality of communications links only when commanded to reconfigure.

7. The dynamically reconfigurable communications network of claim 6, wherein said network configuration manager selectively reconfigures one or more of said multiplicity of routes among said plurality of communications links in response to said commanded to reconfigure by one or more of said plurality of modules.

8. The dynamically reconfigurable communications network of claim 6, wherein said network configuration manager selectively reconfigures one or more of said multiplicity of routes among said plurality of communications links in response to said commanded to reconfigure by the operating system.

9. The dynamically reconfigurable communications network of claim 1, wherein said plurality of communication nodes further comprise:
a plurality of inter-module nodes comprised on said computer chip, wherein each associated module of said plurality of modules is coupled to said plurality of communications links through one or more associated inter-module nodes of said plurality of inter-module nodes;
wherein each of said one or more associated inter-module is operable to (i) receive data from said plurality of communications links, (ii) determine if said data from said plurality of communications links is addressed to said associated module, (iii) provide said data from said plurality of communications links to said associated module if said associated inter-module node determines that said data from said plurality of communications links is addressed to said associated module, (iv) accept data from said associated module for transmission on said plurality of communications links, and (v) transmit said data from said associated module on said plurality of communications links.

10. The dynamically reconfigurable communications network of claim 9, wherein each inter-module node includes:
an off-ramp demultiplexer for coupling to one or more of said plurality of communications links, wherein said off-ramp demultiplexer receives said data from said one or more of said plurality of communications links;
an on-ramp multiplexer for coupling to said one or more of said plurality of communications links and for providing data to said one or more of said plurality of communications links, wherein said on-ramp multiplexer is further coupled to said off-ramp demultiplexer, wherein said off-ramp demultiplexer is operable to provide data to said on-ramp multiplexer;
an input buffer coupled to said off-ramp demultiplexer, wherein said input buffer includes connections for coupling to said associated module;
an output buffer coupled to said on-ramp multiplexer, wherein said output buffer includes connections for coupling to said associated module; and
wherein said off-ramp demultiplexer is operable to receive said data from said one or more of said plurality of communications links and demultiplex a portion of said data from said one or more of said plurality of communications links which comprises data intended for said associated module and provide said data intended for said associated module to said input buffer;
wherein said input buffer is operable to receive and store said data intended for said associated module and provide said data intended for said associated module to said associated module; wherein said input buffer is operable to receive and store data from said associated module and provide said data from said associated module to said on-ramp multiplexer;
wherein said on-ramp multiplexer is operable to receive said data from said associated module and multiplex said data from said associated module with other data received from said off-ramp demultiplexer to form multiplexed data, wherein said on-ramp multiplexer is operable to provide said multiplexed data to said one or more of said plurality of communications links.

11. The computer chip of claim 9, wherein each communication node in a communication path is operable to perform bi-directional communications with every other communication node.

12. The computer chip of claim 1, wherein each of said plurality of communication nodes includes respective configuration logic for dynamically configuring said multiplicity of routes.

13. The computer chip of claim 1, wherein said plurality of communication nodes are bi-directionally coupled and are operable to communicate data with each other.

14. The computer chip of claim 1, wherein each of said communication nodes are directly connected to two or more other communication nodes.

15. A dynamically reconfigurable communications network on a computer chip, comprising:

a plurality of communications links for transmitting data;

a plurality of communication nodes, wherein each of said communication nodes are directly connected to one or more other communication nodes through respective ones of said plurality of communications links, wherein each of said communication nodes are operable to communicate data over the plurality of communications links;

a plurality of modules, wherein each of said plurality of modules is coupled to at least one of said plurality of communication nodes, wherein said plurality of modules are operable to communicate with each other through data transmissions via said communication nodes over a multiplicity of routes;

a network configuration manager comprised on said computer chip, wherein said network configuration manager is coupled to said plurality of communications nodes for dynamically reconfiguring said multiplicity of routes formed by said plurality of communications links and said plurality of communication nodes, wherein said network configuration manager is operable to control said plurality of communications nodes to selectively enable and disable one or more of said communications links to selectively provide communication between selected ones of said plurality of modules along one or more of said multiplicity of routes wherein each of said plurality of communication nodes includes respective configuration logic for dynamically reconfiguring said multiplicity of routes as controlled by said network configuration manager.

16. The dynamically reconfigurable communications network of claim 15, wherein one or more of said plurality of communications nodes further comprises:

a BIST configured to provide power-on integrity checking of operations of its respective communications node.

17. The dynamically reconfigurable communications network of claim 15, wherein one or more of said plurality of communications nodes further comprises:

a power management unit configured to slow or suspend operations of its respective communications node when power conservation is requested by the network configuration manager.

18. The dynamically reconfigurable communications network of claim 15, wherein one or more of said plurality of communications nodes further comprises:

a software debug unit configured to accept requests to register values or monitor data flow for aiding in debugging programming running on the computer chip when debugging is requested by one or more of said plurality of modules.

* * * * *